United States Patent
Pereira et al.

(10) Patent No.: US 8,700,986 B1
(45) Date of Patent: Apr. 15, 2014

(54) SYSTEM AND METHOD FOR DISPLAYING A DOCUMENT CONTAINING FOOTNOTES

(75) Inventors: Luiz Pereira, New York, NY (US); Edgard Lindner, New York, NY (US); Venkat Ganesan, New York, NY (US); Kevin Markman, New York, NY (US); Lily Xia, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/207,051

(22) Filed: Aug. 10, 2011

Related U.S. Application Data

(60) Provisional application No. 61/454,163, filed on Mar. 18, 2011.

(51) Int. Cl.
*G06F 17/24* (2006.01)
*G06F 17/25* (2006.01)

(52) U.S. Cl.
USPC .......................................... 715/230; 715/232

(58) Field of Classification Search
USPC ................................................. 715/230, 232
See application file for complete search history.

(56) References Cited

U.S. PATENT DOCUMENTS

| | | | |
|---|---|---|---|
| 4,889,439 A | 12/1989 | Cook et al. | |
| 5,111,397 A * | 5/1992 | Chirokas et al. | 715/205 |
| 5,379,373 A * | 1/1995 | Hayashi et al. | 715/235 |
| 5,694,609 A | 12/1997 | Murata | |
| 5,895,476 A | 4/1999 | Orr et al. | |
| 6,717,593 B1 | 4/2004 | Jennings | |
| 7,231,597 B1 * | 6/2007 | Braun et al. | 715/201 |
| 7,487,448 B2 | 2/2009 | Emerson et al. | |
| 7,836,148 B2 | 11/2010 | Popp et al. | |
| 7,920,894 B2 | 4/2011 | Wyler | |
| 8,005,858 B1 * | 8/2011 | Lynch et al. | 707/771 |
| 2004/0239700 A1 * | 12/2004 | Baschy | 345/781 |
| 2005/0177805 A1 * | 8/2005 | Lynch et al. | 715/968 |
| 2008/0092066 A1 * | 4/2008 | Edlund et al. | 715/760 |
| 2009/0234837 A1 * | 9/2009 | Gladyshev | 707/5 |
| 2010/0175021 A1 * | 7/2010 | Ferrara et al. | 715/784 |
| 2011/0264997 A1 * | 10/2011 | Mukerjee et al. | 715/256 |

OTHER PUBLICATIONS

Hearnden, Wave Editor & Document Renders, A talk by Dave Hearnden at teh Wave Summit captured in video on YouTube Nov. 12, 2010, retrieved from the Internet May 23, 2012: http://youtu.be/EuXApEullzc.

Wang et al, Google Wave Operational Transformation, Jul. 1, 2010, 1-6, retrieved from the Internet Feb. 14, 2012: http://wave-protocol.googlecode.com/hg/whitepapers/operational-transform/operational-transform.html.

(Continued)

*Primary Examiner* — Laurie Ries
*Assistant Examiner* — Soumya Dasgupta
(74) *Attorney, Agent, or Firm* — Ropes & Gray LLP

(57) ABSTRACT

A plurality of objects associated with respective footnote reference information within a document are generated. An overflow object associated with overflow footnote reference information corresponding to a previous footnote marker appearing on a previous page is invoked to lay out the overflow footnote reference information, generating overflow layout data. A current page object associated with current page footnote reference information that corresponds to a current page footnote marker appearing on the page is invoked to lay out the current page footnote reference information, generating current page footnote reference information layout data, if an available footnote height is sufficient to lay out the current page footnote reference information. The page is displayed based on the overflow layout data and the current page footnote reference information layout data.

19 Claims, 8 Drawing Sheets

(56) References Cited

OTHER PUBLICATIONS

Danilatos, Demonstration Doodad, with a few different variations of rendering and interactive behaviour, Dec. 5, 2010, 1-3, retrieved from the Internet May 24, 2012: http://code.google.com/p/wave-protocol/source/browse/src/org/waveprotocol/wave/client/editor/examples/img/MyDoodad.java.

Chitu, Footnotes in GoogleDocs, Oct. 17, 2008, XP055028085, retreived from the Internet May 24, 2012: http://googlesystem.blogspot.com/2008/10/footnots-in-google-docs.html, 1 page.

Peels et al., Document Architecture and Text Formatting, ACM Transactions on Office Information Systems, XX, XX, 3 Oct. 1, 1985, 347-369.

Danilatos, Riche Text Editor—Message dated Jun. 10, 2010 8:57am, Wave Protocol Group Discussion Forum, Jun. 10, 2010, XP055027976, retrieved from the Internet May 23, 2012: https://groups.google.com/group/wave-protocol/browse_thread/thread/73608bf7a13f2385, 2 pages.

Nichols et al., High-Latency, Low-Bandwidth Windowing in the Jupiter Collaboration System, UIST '95. 8th Annual Symposium on User Interface Software and Technology. Proceedings of the ACM Symposium on User Interface Software and Technology, Nov. 14-17, 1995, 111-120.

Brouwer et al., MathDox editor, Electronic Proceedings MathUI 2009, 2009, XP55028009, retrieved from the Internet May 23, 2012: http://www.win.tue.nl/hansc/mde.pdf.

International Search Report and Written Opinion issued in PCT/US2012/028279 on Jun. 6, 2012.

International Search Report and Written Opinion issued in PCT/US2012/028102 on Jun. 5, 2012.

Unpublished U.S. Appl. No. 13/206,896, filed Aug. 10, 2011.
Unpublished U.S. Appl. No. 13/207,117, filed Aug. 10, 2011.
Unpublished U.S. Appl. No. 13/207,176, filed Aug. 10, 2011.

\* cited by examiner

SYSTEM AND METHOD FOR DISPLAYING A DOCUMENT CONTAINING FOOTNOTES

This application claims the benefit of U.S. Provisional Patent Application No. 61/454,163, filed Mar. 18, 2011, which is hereby incorporated by reference herein.

TECHNICAL FIELD

This specification relates generally to systems and methods for processing documents, and more particularly to systems and methods for displaying documents.

BACKGROUND

Online document processing services allow users to create and manipulate documents via the Internet, and store the documents at a remote location. Typically, a user accesses an online document processing service using a web browser operating on a computer or other device. Many existing document management services offer common word processing functions, including text editing, text searching, etc. By storing a document at the remote location, a user can access the document from any location, using a computer or other user device that has access to the Internet.

SUMMARY OF THE INVENTION

In accordance with an embodiment, a plurality of objects associated with respective footnote reference information within a document are generated, each respective object having a layout function for laying out the associated footnote reference information. An overflow object associated with overflow footnote reference information corresponding to a previous footnote marker appearing on a previous page is identified and invoked to lay out the overflow footnote reference information on the page, generating overflow layout data. An available footnote height is determined based on the overflow layout data. A current page object associated with current page footnote reference information that corresponds to a current page footnote marker appearing on the page is identified, and the current page object is invoked to lay out the current page footnote reference information on the page, generating current page footnote reference information layout data, if the available footnote height is sufficient to lay out the current page footnote reference information. The page is displayed based on the overflow layout data and the current page footnote reference information layout data.

In one embodiment, each respective object is a programming class that includes a set of properties that define and store the associated footnote reference information.

In one embodiment, an available text element height is determined based on the overflow layout data, and a text element object is invoked to lay out a text element within the available text element height, generating text element layout data.

In one embodiment, the first footnote marker is located within the text element. The available footnote height is determined based on the overflow layout data and the text element layout data, and the page is displayed based on the overflow layout data, the text element layout data, and the first footnote reference information layout data.

These and other advantages of the present disclosure will be apparent to those of ordinary skill in the art by reference to the following Detailed Description and the accompanying drawings.

DETAILED DESCRIPTION

Figure 1:
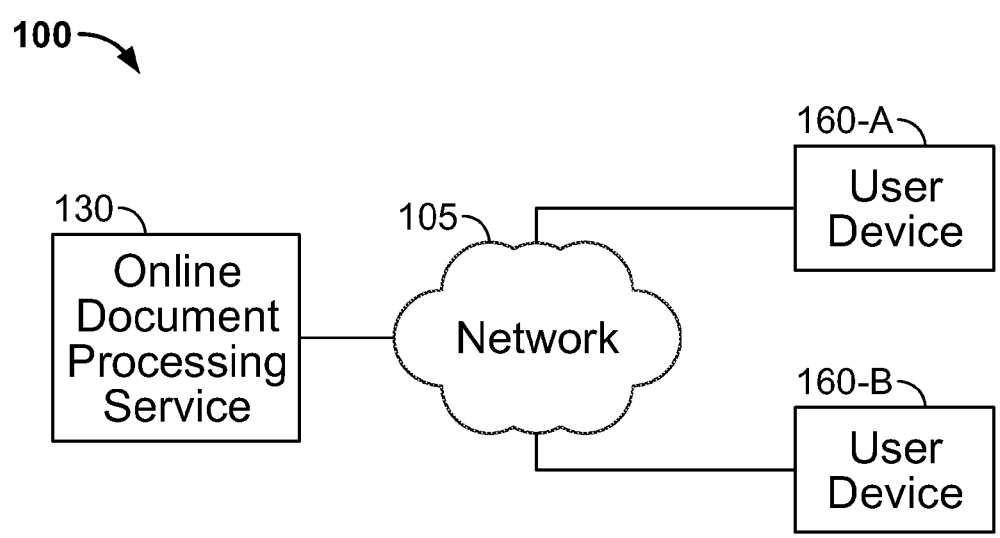
FIG. 1 shows a communication system that may be used to provide document processing services in accordance with an embodiment.

FIG. 1 shows a communication system 100 that may be used to provide document processing services in accordance with an embodiment. Communication system 100 includes a network 105, an online document processing service 130, and user devices 160-A, 160-B, etc. For convenience, the term "user device 160" is used herein to refer to any one of user devices 160-A, 160-B, etc. Accordingly, any discussion herein referring to "user device 160" is equally applicable to each of user devices 160-A, 160-B, etc. Communication system 100 may include more or fewer than two user devices.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Online document processing service 130 provides document processing services to users via network 105, enabling users to create, display, and edit documents remotely. For example, online document processing service 130 may provide online word processing services, allowing users to create, store, and edit text documents and other types of documents. Online document processing service 130 may be accessible via a World Wide Web page that may be viewed using a conventional Web browser, for example. A user may be required to log into a respective user account to access his or her document(s). Online document processing service 130 may offer common word processing features such as text editing, text searching, table creation and editing, footnote creation and editing, etc. Online document processing service 130 may also provide other functions such as image creation and editing, spreadsheet management, etc. Online document processing service 130 may grant to a user access rights with respect to a document, such as viewing and editing rights.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
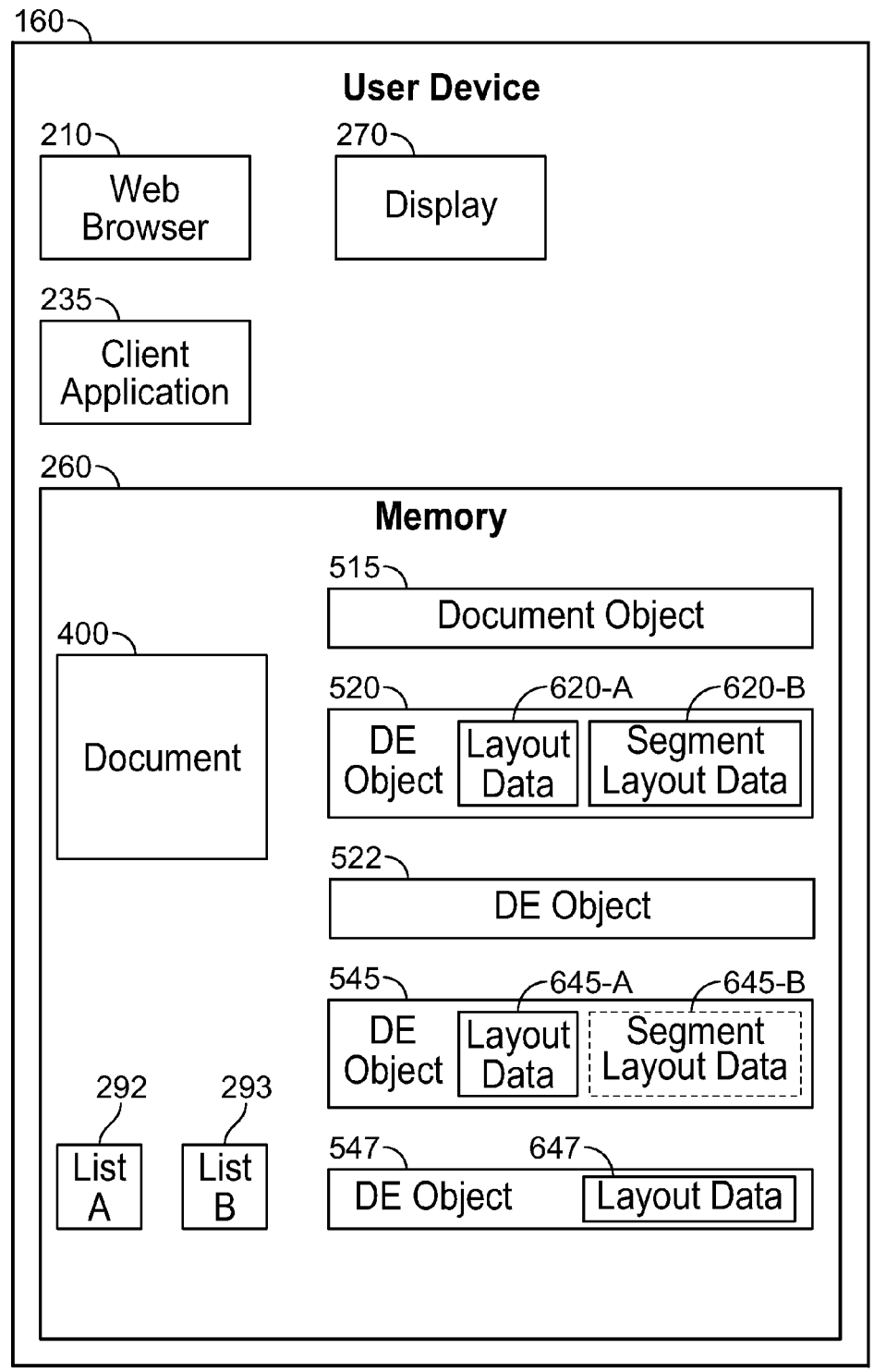
FIG. 2 shows functional components of an exemplary user device in accordance with an embodiment.

FIG. 2 shows functional components of an exemplary user device 160 in accordance with an embodiment. User device 160 includes a web browser 210 and a display 270. Web browser 210 may be a conventional web browser used to access World Wide Web sites via the Internet, for example. Display 270 displays documents, images, Web pages, and other information to a user. For example, a text document that a user creates or edits may be displayed on display 270.

User device 160 also includes a client application 235 and a memory 260. Client application 235 may examine a document and generate objects associated with various elements in the document. Memory 260 is used by components of user device 160 to store various types of data, including documents, objects, software code, etc. Examples of documents and objects that may be stored in memory 260 are illustrated in FIG. 2 and described below.

Figure 3:
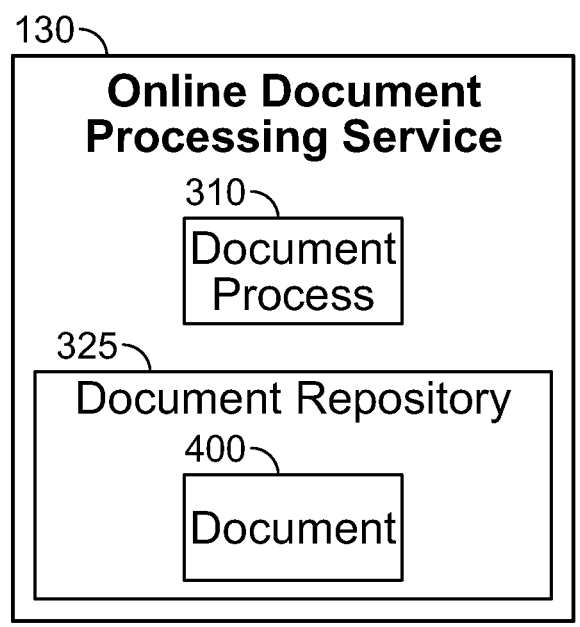
FIG. 3 shows functional components of an online document processing service in accordance with an embodiment.

FIG. 3 shows functional components of online document processing service 130 in accordance with an embodiment. Online document processing service 130 includes a document process 310 and a document repository 325. Document process 310 manages documents and performs operations requested by users, such as creating documents, editing text, performing text searches, etc. Documents created by users are stored in document repository 325. A document created by a user may be stored in association with his or her user account, for example. Multiple versions of a user's document may be stored in document repository 325.

In accordance with the embodiment of FIG. 1, a user may access online document processing service 130 and create and/or edit a document. For example, a user may employ browser 210 to access a World Wide Web site maintained by online document processing service 130. In a well-known manner, the user may be required to log into a user account to access his or her documents. The user may be required to authenticate his or her identity, e.g., by entering a user name and password, before accessing his or her user account and documents associated with the account. Online document processing service 130 may verify the user's access rights with respect to a document before granting the user access to the document.

Figure 4:
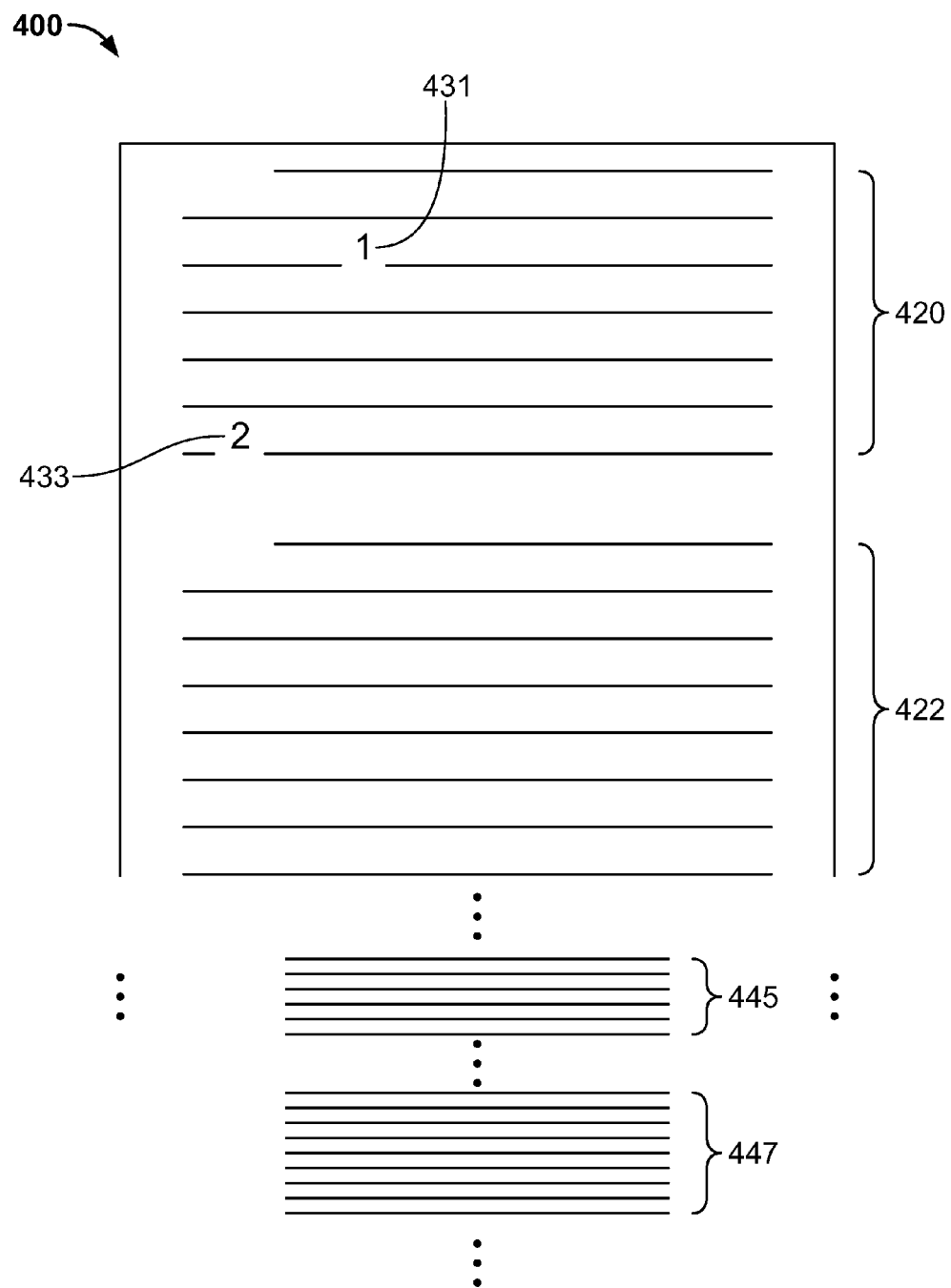
FIG. 4 shows a document in accordance with an embodiment.

Suppose, for example, that a user employs web browser 210 to access online document processing service 130 and creates a new document, such as document 400 illustrated in FIG. 4. In the illustrative embodiment, document 400 includes text, including paragraphs 420 and 422. Paragraph 420 includes footnote marker 431 and footnote marker 433. Document 400 also includes footnote reference information 445, which includes the footnote reference(s), explanatory information, and other data that corresponds to footnote marker 431, and footnote reference information 447, which includes the footnote reference(s), explanatory information, and other data that corresponds to footnote marker 433. In various embodiments, a document may include lines of text, images, tables, headers, footers, footnotes, pages, and/or other elements. Online document processing service 130 stores document 400, or data representing document 400, in document repository 325, as shown in FIG. 3. Online document processing service 130 may store a document model representing document 400, for example. The user may subsequently employ user device 160, or another device, to access document 400 via the Internet.

A well-known technique used by online document processing services to display a document on a user device includes transmitting data adapted to cause the user device to display a representation of all or a portion of the document on a Web page. For example, online document processing service 130 may transmit to browser 210 a request, in the form of HyperText Markup Language (HTML), adapted to cause browser 210 to display a representation of document 400. In response, browser 210 displays a representation of all or a portion of document 400.

Existing online document processing services lay out a selected page of a document in its entirety. If a change is made to the page, the entire page is laid out again in its entirety. This process can be unacceptably slow for users, particularly in a relatively limited development environment such as a web browser or mobile application.

In one embodiment of the invention, user device 160 lays out and renders elements of a document using an architecture based on a hierarchy of objects. As used herein, the term "element" means an element of a document such as a paragraph, a line of text, footnote reference information corresponding to a footnote marker, an image, a table, a header, a footer, a page, etc. Objects and the hierarchical relationship between various objects are described below. Methods, apparatus, and systems for generating and using objects to lay out and render elements in a document are also described in U.S. patent application Ser. No. 13/206,896, filed on Aug. 10, 2011, entitled System and Method for Displaying a Document, which is hereby incorporated by reference.

An object is a programming class that includes a set of properties that define and store the state of an associated element. For example, an object associated with a particular paragraph may include properties defining the first and last alphanumeric characters of the paragraph. An object also includes functions and methods for manipulating the properties of the object. For example, an object associated with a paragraph may include functions and/or methods for determining whether the paragraph's position collides with a position of another element, finding a cursor location, drawing a new line at the end of the paragraph, etc.

Each object includes a layout function that defines calculations used to display the corresponding element. For example, an object associated with a paragraph includes a layout function for determining where to place each line in the paragraph and whether the paragraph can fit into a given amount of space provided. An object corresponding to a line of text includes a layout function for determining where to place each word in the line. The layout function of an object generates layout data representing the layout of the associated element. For example, an object associated with a paragraph generates layout data indicating which alphanumeric characters are to be placed on which lines of the paragraph. When an object generates layout data, the layout data is stored temporarily within the object itself.

Each object also includes a render function to render the associated element. For example, an object's render function may modify the HyperText Markup Language ("HTML") of a webpage based on layout data associated with a particular element, causing a web browser to render the element. Alternatively, an object's render function may define one or more vectors for displaying an element (as used in the HTML5 Canvas element and other similar tools).

Objects may be organized in a hierarchical relationship. For example, an object responsible for a document as a whole may be a parent object with respect to objects associated with various paragraphs, tables, images, etc., within a document. An object responsible for a paragraph may have child objects responsible for lines of text within the paragraph. An object responsible for a paragraph (or other element) may also have a child object responsible for footnote reference information that corresponds to a footnote marker located in the paragraph. A parent object keeps track of its own child objects. An object responsible for a table may have child objects responsible for rows within the table, each of which has child objects responsible for cells within the respective rows. An object responsible for a cell may in turn have a child object responsible for another table stored within the cell.

An object responsible for a document as a whole keeps track of the elements within the document, and the relationships and locations of the elements with respect to each other. The object responsible for a document also keeps track of the number of pages in the document, and activates relevant child objects in order to display a particular page of the document on a display device. The object responsible for a document may determine which elements within the document belong on a current page and instruct the corresponding objects to render those elements, for example.

The architecture described above may be used to display an element of a document that contains one or more footnote markers, and corresponding footnote reference information. The footnote marker(s) may be located within text, in a table, or elsewhere within a document. In accordance with an embodiment, one or more elements containing footnote markers, and corresponding footnote reference information, within a document maintained by an online document processing service, are identified, laid out, and rendered on user device 160.

Figure 5:
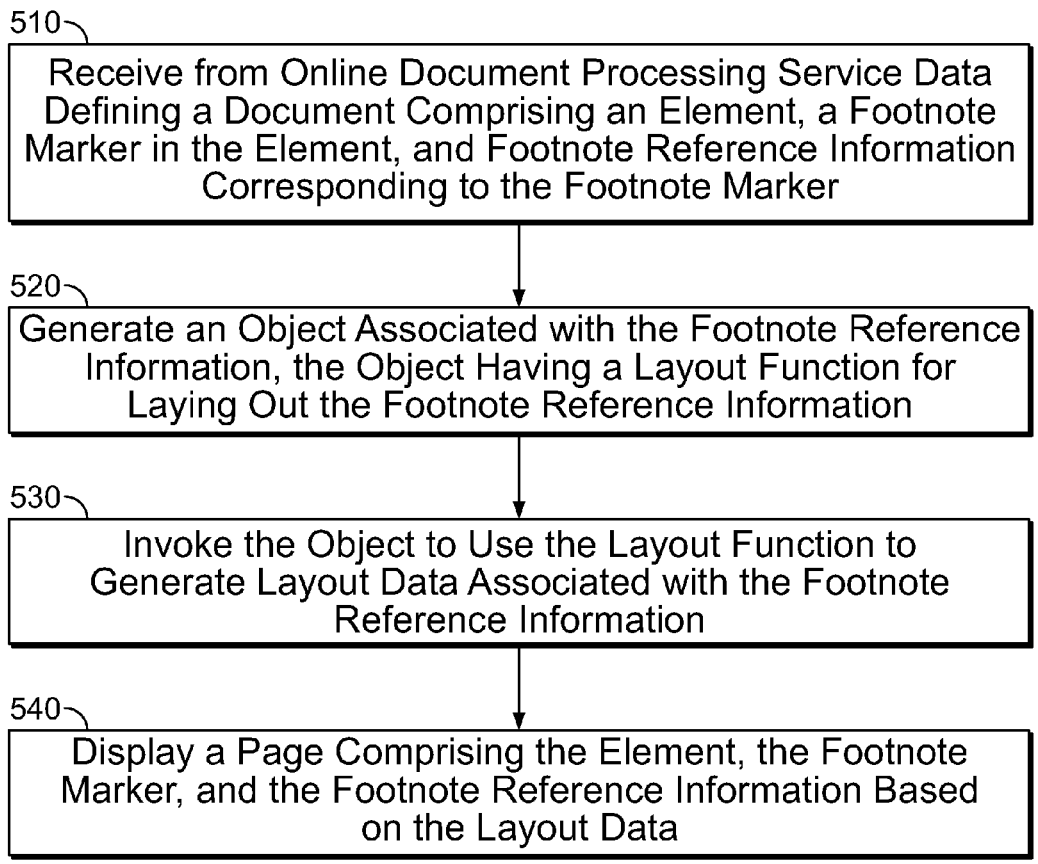
FIG. 5 is a flowchart of a method for providing document processing services in accordance with an embodiment.

FIG. 5 is a flowchart of a method for laying out and rendering one or more elements of a document on a user device, in accordance with an embodiment. At step 510, data defining a document including an element, a footnote marker within the element, and footnote reference information corresponding to the footnote marker, is received from online document processing service 130. The element may be a paragraph, a line of text, an image, a table, a header, a footer, etc. When document 400 is created, for example, or when the user subsequently employs user device 160 to log into his or her account and access document 400, online document processing service 130 transmits data representing the document to user device 160. For example, online document processing service 130 may transmit to user device 160 a data model corresponding to document 400. Online document processing service 130 may alternatively transmit the text of document 400 and associated metadata. Other types of data relating to a document may be provided to user device 160. Client application 235 stores document 400 in memory 260.

Client application 235 parses the data model representing document 400 to identify the structure of the document and to identify various elements within the document, such as paragraphs, footnote markers and corresponding footnote reference information, tables, images, etc. Document 400 itself is identified as an element. In addition, client application 235 identifies a plurality of other elements within the document, including paragraph 420 (including footnote markers 431 and 433), paragraph 422, footnote reference information 445 and footnote reference information 447 (shown in FIG. 4). In other embodiments, other types of elements may be identified in a document, such as images, words, lines of text, tables, headers, footers, pages, chapters, etc.

Client application 235 generates an object corresponding to document 400, referred to herein as a "document object." The document object includes a layout function and a render function for document 400. The document object also includes information defining the relationships between elements in document 400, such as the locations of paragraphs 420, 422, etc. The document object is stored in memory 260 as document object 515, as shown in FIG. 2.

Client application 235 also generates an object corresponding to each element within document 400. An object corresponding to an element within a document is referred to herein as a "document element object" or "DE object." Thus, referring to FIG. 4, client application 235 generates a DE object that corresponds to paragraph 420 and has a first function for laying out paragraph 420 and a second function for rendering paragraph 420. This DE object is stored in memory 260 as DE object 520. Client application 235 also generates a DE object that corresponds to paragraph 422 and has a first function for laying out paragraph 422 and a second function for rendering paragraph 422. This DE object is stored in memory 260 as DE object 522.

At step 520, an object associated with the footnote reference information and having a layout function for laying out the footnote reference information is generated. Accordingly, client application 235 generates a DE object that corresponds to footnote reference information 445 and has a layout function for laying out footnote reference information 445. The DE object also has a render function for rendering footnote reference information 445. This DE object is stored in memory 260 as DE object 545.

In one embodiment, because footnote marker 431 is located within paragraph 420, the object associated with paragraph 420 is a parent object with respect to, and is responsible for certain aspects of, the DE object 545, which is associated with footnote reference information 445 (corresponding to footnote marker 431).

Client application 235 also generates a DE object that corresponds to footnote reference information 447 and has a layout function for laying out footnote reference information 447 and a render function for rendering footnote reference information 447. This DE object is stored in memory 260 as DE object 547. DE object 520 (responsible for paragraph 420) is a parent object with respect to DE object 547.

Client application 235 may generate other DE objects corresponding to other elements within document 400. Client application 235 may generate a DE object for particular lines of text within paragraphs 420 and 422 as well (such DE objects are not shown).

In order to display elements associated with a selected location within document 400, document object 515 identifies one or more elements associated with the selected location. For example, document object 515 may define a page including one or more elements. In the illustrative embodiment, document object 515 determines that paragraphs 420 and 422 are associated with a current page. Document object 515 instructs objects associated with elements located before paragraph 420 to layout their respective objects (such elements are not shown).

At step 530, the object is invoked to use the layout function to generate layout data associated with the footnote reference information. When document object 515 invokes DE object 520 to generate layout data corresponding to paragraph 420, DE object 520 determines that footnote marker 431 is located within paragraph 420 and, in response, invokes DE object 545 to lay out footnote reference information 445.

Accordingly, DE object 545 lays out footnote reference information 445, generating layout data, which is stored in DE object 545 as layout data 645-A. In some embodiments, only a reduced segment of footnote reference information 445 may be laid out. In such case, layout data 645-A comprises information relating to the layout of the reduced segment. Methods, apparatus, and systems for defining a reduced segment of an element within a document, and for generating layout data associated with the reduced segment, are described in U.S. patent application Ser. No. 13/206,896, filed on Aug. 10, 2011, entitled System and Method for Displaying a Document, which is hereby incorporated by reference.

After DE object 545 lays out footnote reference information 445, an available height indicating an amount of space remaining on the page is determined and, if the available height is greater than a predetermined limit (i.e., if there is sufficient space to lay out at least a portion of paragraph 420), DE object 520 lays out paragraph 420, or a portion thereof, within the available height. If the available height is insufficient to lay out all of paragraph 420, a reduced segment of paragraph 420 is defined and laid out.

In the exemplary embodiment, the entire paragraph 420 is not laid out on the page. Accordingly, DE object 520 generates layout data associated with a reduced segment of paragraph 420. The layout data is stored in DE object 520 as layout data 620-A.

Figure 6:
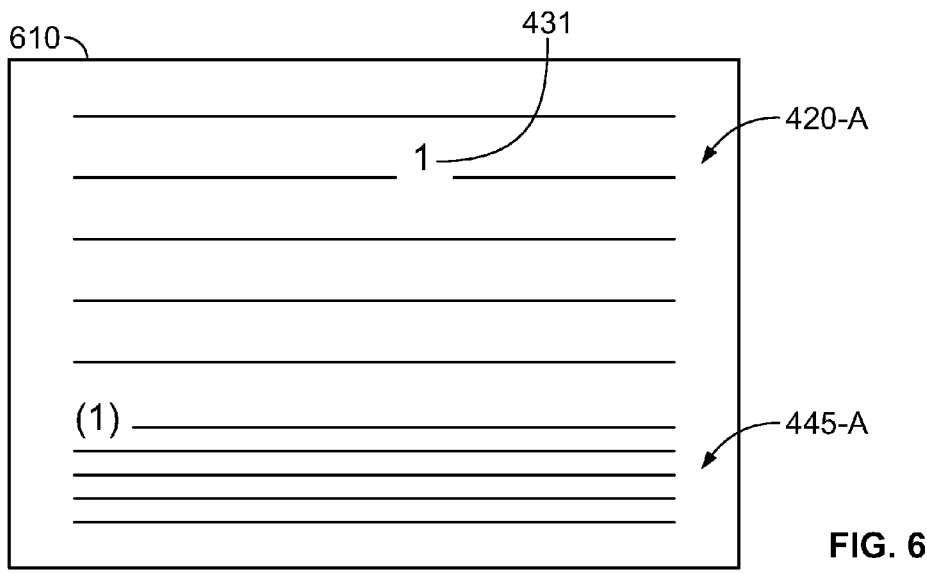
FIG. 6 shows a page displaying elements of a document in accordance with an embodiment.

At step 540, a page including the element, the footnote marker, and the footnote reference information is displayed based on the layout data. To display the page, the appropriate objects are invoked to render the reduced segment of paragraph 420, including footnote marker 431, and the reduced segment of footnote reference information 445. FIG. 6 shows a page 610 displaying a reduced segment 420-A of paragraph 420, including footnote marker 431, and a reduced segment 445-A of footnote reference information 445. Page 610 may be displayed on display device 270.

In accordance with an embodiment, when data defining a document is received from online document processing service 130, an asynchronous technique is used to identify and lay out elements in the document. Accordingly, elements within the document are identified and laid out in the manner described above, generating layout data for all identified elements in sequential order, from the beginning of the document to the end of the document. A selected page of the document is then displayed, by rendering the associated elements based on the layout data. For example, the first page of the document may be displayed. This asynchronous layout method may be performed if the layout data is generated for all the identified elements in the document before the user scrolls down or otherwise indicates a desire to view a location in the document located after the first page.

If, however, the user scrolls down or otherwise indicates a desire to view a location in the document that has not yet been laid out, a synchronous layout technique may used to lay out and display the elements. Thus, in one embodiment, when data defining a document is received from online document processing service 130, the asynchronous layout method described above is used to identify and lay out elements within the document. Document object 515 starts at the beginning of the document and instructs the DE objects associated with various elements in the document to generate layout data for their respective elements, in sequential order, in accordance with the asynchronous layout method. However, if the user scrolls down or otherwise indicates a desire to view a location in the document that has not yet been laid out, the sequential procedure is discontinued. Instead, in accordance with the synchronous layout method, elements located at and before the user's desired location are laid out, and the desired location is displayed. After the desired location has been displayed, the asynchronous (sequential) layout method is resumed and the remaining elements in the document are laid out. Methods, apparatus and systems for laying out elements in a document using synchronous and asynchronous techniques are described in U.S. patent application Ser. No. 13/206,896, filed Aug. 10, 2011, entitled System and Method for Displaying a Document, which is hereby incorporated by reference.

Figure 7A:
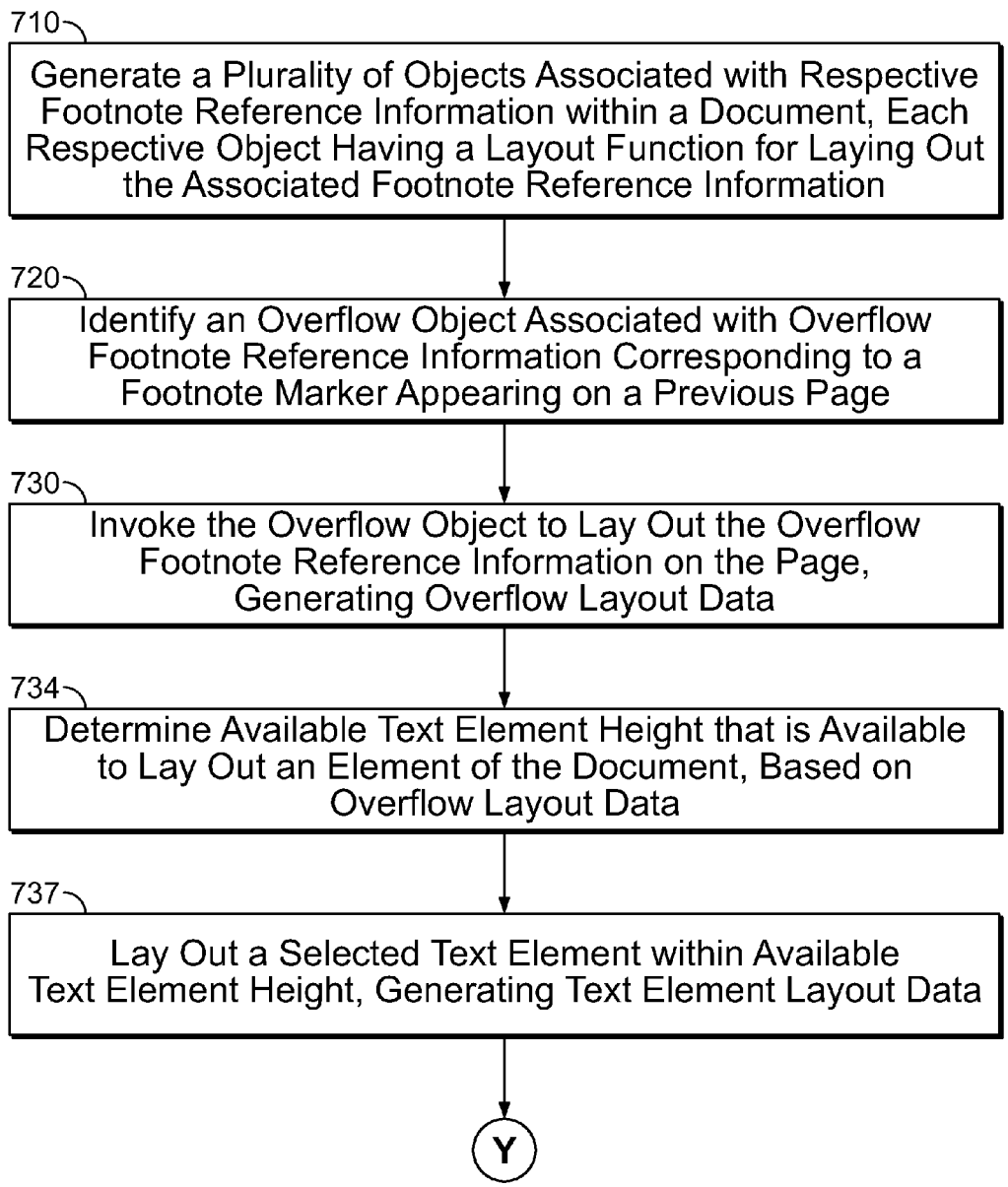
FIGS. 7A-7B are a flowchart of a method for providing document processing services in accordance with an embodiment.
Figure 7B:
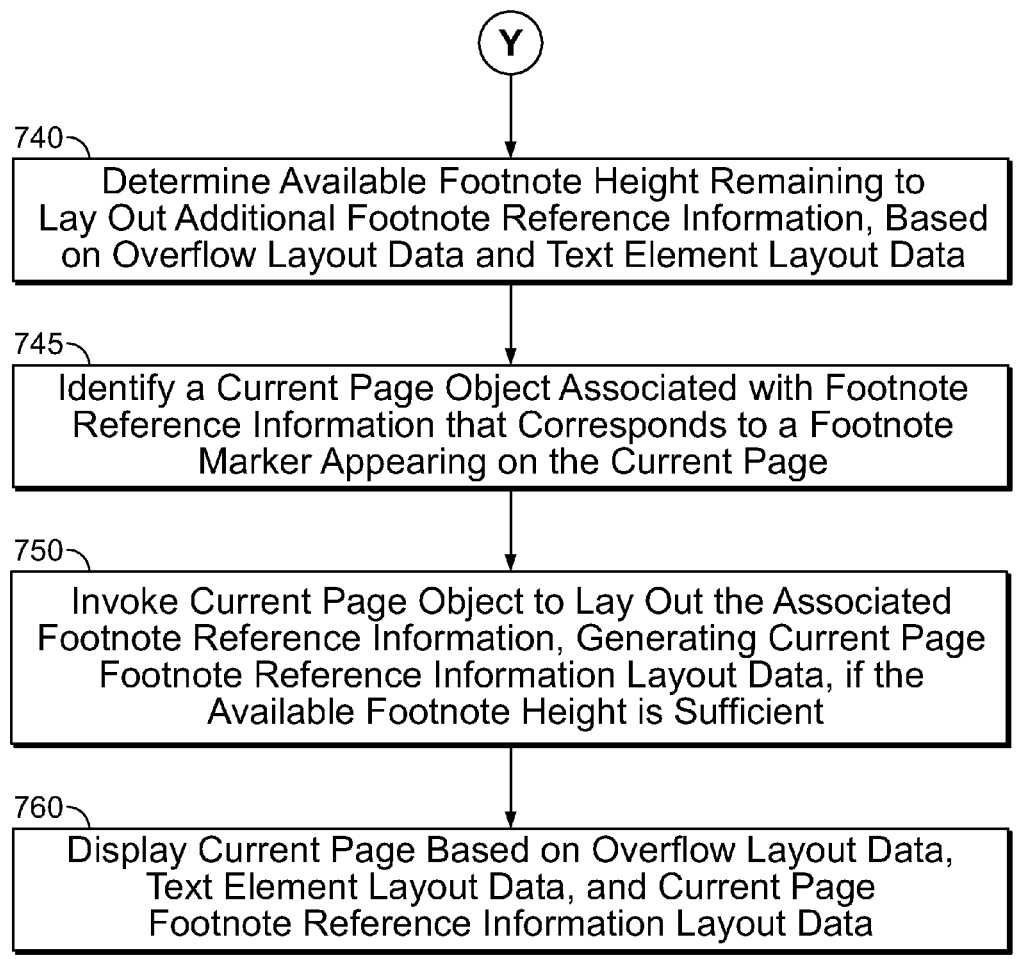

In accordance with an embodiment, while a particular page is being laid out, footnote reference information corresponding to footnote markers located on previous pages is laid out before footnote reference information corresponding to footnote markers located on the particular page. FIGS. 7A-7B are a method for displaying a document that contains footnote markers and footnote reference information in accordance with an embodiment.

At step 710, a plurality of objects associated with respective footnote reference information within a document are generated, where each respective object has a layout function for laying out the associated footnote reference information. Each object also has a render function for rendering the associated footnote reference information. The footnote reference information associated with a particular object may include a defined amount of footnote reference information corresponding to a particular footnote marker, such as footnote reference information 445. As discussed above, client application 235 may generate objects corresponding to elements within document 400, including paragraphs 420, paragraph 422, and footnote reference information 445.

As shown in FIG. 6 and described above, a reduced segment 420-A of paragraph 420 and a reduced segment 445-A of footnote reference information 445 were previously laid out and displayed on page 610. Accordingly, a remaining portion of paragraph 420 and a remaining portion of footnote reference information 445 remain to be laid out on a subsequent page.

In an embodiment of the invention, a first list identifying first objects that correspond to footnote reference information associated with footnote markers on a selected page is generated, and a second list identifying second objects that correspond to "overflow" footnote reference information associated with footnote markers on a page previous to the selected page is generated. Accordingly, when the page following page 610 (of FIG. 6) is to be laid out, a first list identifying footnote reference information corresponding to footnote markers that appear on that following page is created. A second list identifying "overflow" footnote reference information corresponding to footnote markers appearing on previous pages (including page 610) is also created. Each list may identify any number of objects, or may identify no objects. For example, each list may include one or more pointers identifying the objects. Referring to FIG. 2, the first list is stored in memory 260 as list A (292). The second list is stored in memory 260 as list B (293).

In one embodiment, the first list (list A 292) and the second list (list B 293) may not be populated immediately but are instead populated as the method outlined below is performed.

At step 720, an "overflow" object associated with overflow footnote reference information corresponding to a footnote marker appearing on a previous page, is identified. In the exemplary embodiment, the second list (list B 293) is examined and DE object 545 (corresponding to footnote reference information 445) is identified.

If any overflow footnote reference information has already been laid out on the page, then an available overflow footnote height is determined. For example, the overflow footnote height may be calculated as a predetermined height associated with the page minus the height already used to lay out overflow footnote reference information. Supposing that the overflow footnote height is sufficient to lay out the overflow footnote reference information associated with the "overflow" object identified at step 720, the method proceeds to step 730.

At step 730, the "overflow" object is invoked to lay out the associated overflow footnote reference information on the page, generating overflow layout data. Accordingly, document object 515 invokes DE object 545 to lay out the remaining segment of footnote reference information 445. Document object 515 also informs DE object 545 of the available overflow footnote height. In response, DE object 545 lays out the remaining segment of footnote reference information 445, generating segment layout data 645-B, which is stored in DE object 545 (shown in FIG. 2).

If the available overflow footnote height is insufficient to lay out all of the remaining segment of footnote reference information 445, then DE object 545 defines a reduced segment of footnote reference information 445 and lays out the reduced segment. The remaining portion of the footnote reference information 445 is added a second list associated with the following page.

In one embodiment, the second list (list B 293) is examined and if any additional second "overflow" objects remain on the second list, then steps 720 and 730 are repeated until all overflow footnote reference information is laid out before the method proceeds to step 734.

At step 734, an available text element height that is available to lay out a paragraph or other element of the document is determined based on the overflow layout data. In the exemplary embodiment, the available text element height may be calculated as a predetermined page height associated with the page minus a height used by layout of the remaining segment of footnote reference information 445 and of any other overflow footnote reference information. Supposing that the available text element height is greater than zero, the method proceeds to step 737.

At step 737, a selected text element is laid out within the available text element height, generating text element layout data. Accordingly, DE object 520 is invoked to lay out the remaining portion of paragraph 420. DE object 520 accordingly defines a segment containing the remaining portion of paragraph 420 (which includes footnote marker 433), and lays out the segment, generating text segment layout data. The text segment layout data is stored in DE object 520 as text segment layout data 620-B.

At step 740, an available footnote height that remains to lay out additional footnote reference information is determined based on the overflow layout data and the text element layout data. In the exemplary embodiment, the available footnote height is calculated as the available height below footnote marker 433 minus the amount of height already used to lay out footnote reference information 445. Accordingly, the available footnote height is determined based on a location of footnote marker 433 and on segment layout data 645-B.

At step 745, a current page object associated with footnote reference information that corresponds to a footnote marker appearing on the page is identified. In the exemplary embodiment, DE object 547, which is associated with footnote reference information 447, is identified. Footnote reference information 447 corresponds to footnote marker 433, which appears in the laid-out portion of paragraph 420.

At step 750, the current page object is invoked to lay out associated footnote reference information on the current page, to generate current page footnote reference information layout data, if the available footnote height is sufficient to lay out the associated footnote reference information. Therefore, if sufficient available footnote height remains, document object 515 invokes DE object 547 to lay out footnote reference information 447. In the exemplary embodiment, the available footnote height is sufficient to lay out footnote reference information 447; accordingly, DE object 547 lays out footnote reference information 447, generating layout data 647. DE object 547 is added to the first list (list A 292). In the exemplary embodiment, the method proceeds to step 760.

In one embodiment, if the available footnote height is insufficient to lay out footnote reference information 447, a reduced segment of the footnote reference information is defined, and DE object 547 lays out the reduced segment. DE object 547 is added to the first list. A second reduced segment including the remaining portion of footnote reference information 447 is defined for inclusion on the following page.

In one embodiment, if additional footnote markers appear on the text laid out on the current page, additional footnote reference information may be laid out on the page. In particular, the available footnote height value may be updated, and the steps 745 and 750 described above may be repeated.

Figure 8:
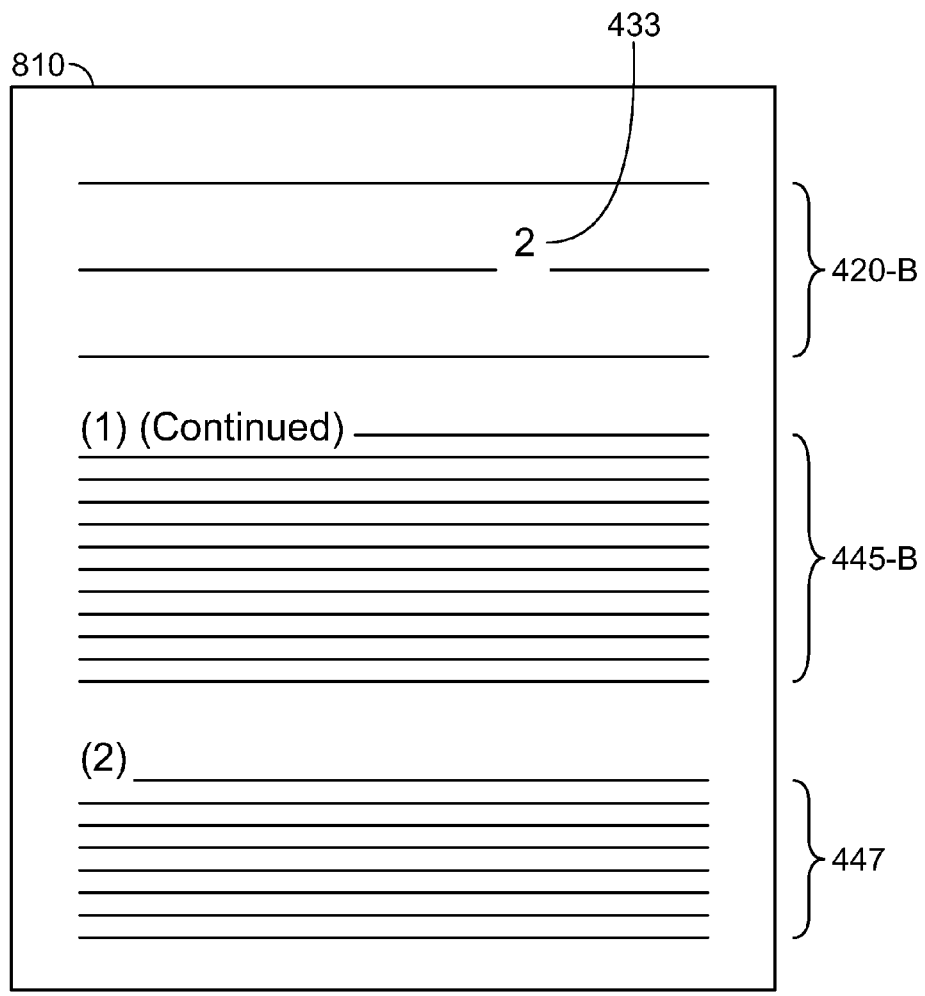
FIG. 8 shows a page displaying elements of a document in accordance with an embodiment.

At step 760, the current page is displayed based on the overflow layout data, the text element layout data, and the current page footnote reference information layout data. FIG. 8 shows a page 810 containing a segment 420-B of paragraph 420, including footnote marker 433, a remaining segment 445-B of footnote reference information 445, and footnote reference information 447 (which corresponds to footnote marker 433). In the illustrative embodiment, segment 420-B is rendered based on text segment layout data 620-B, segment 445-B is rendered based on segment layout data 645-B, and footnote reference information 447 is rendered based on layout data 647.

In various embodiments, the method steps described herein, including the method steps described in FIGS. 5 and/or 7A-7B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5 and/or 7A-7B. Certain steps of the methods described herein, including one or more of the steps of FIGS. 5 and/or 7A-7B, may be performed by a server or by another processor in a network-based cloud-computing system. Certain steps of the methods described herein, including one or more of the steps of FIGS. 5 and/or 7A-7B, may be performed by a client computer in a network-based cloud computing system. The steps of the methods described herein, including one or more of the steps of FIGS. 5 and/or 7A-7B, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5 and/or 7A-7B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 9:
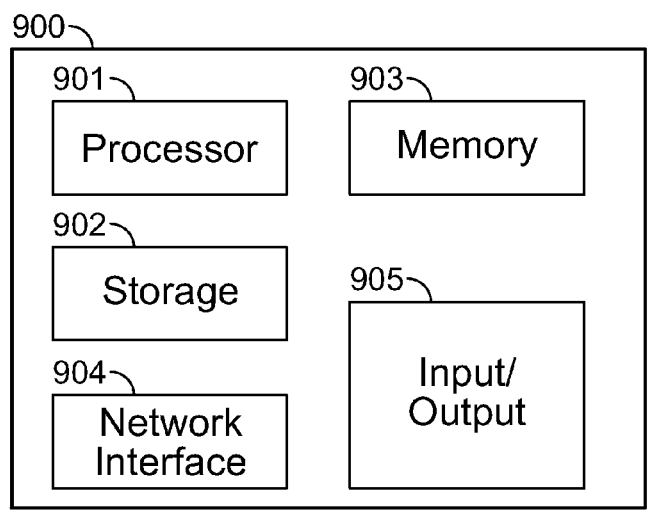
FIG. 9 shows components of a computer that may be used to implement the invention.

A high-level block diagram of an exemplary computer that may be used to implement systems, apparatus and methods described herein is illustrated in FIG. 9. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Thus, the method steps of FIGS. 5 and/or 7A-7B can be defined by the computer program instructions stored in memory 903 and/or data storage device 902 and controlled by the processor 901 executing the computer program instructions. For example, the computer program instructions can be implemented as computer executable code programmed by one skilled in the art to perform an algorithm defined by the method steps of FIGS. 5 and/or 7A-7B. Accordingly, by executing the computer program instructions, the processor 901 executes an algorithm defined by the method steps of FIGS. 5 and/or 7A-7B. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate arrays (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including online document processing service 130, user device 160, and components thereof, including web browser 210, display 270, client application 235, memory 260, document process 310, and document repository 325, may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for displaying footnote reference information in a document, the method comprising:
   generating a first footnote object corresponding to first footnote reference information associated with a first footnote marker located on a first page of a document, the first footnote object comprising a first footnote layout function for laying out the first footnote reference information and a first footnote render function for rendering the first footnote reference information;
   identifying an overflow object associated with overflow footnote reference information corresponding to a second footnote marker appearing on a second page, the overflow object comprising an overflow object layout function for laying out the overflow footnote reference information and an overflow object render function for rendering the overflow footnote reference information, the overflow object being different from the first footnote object;

invoking, by a document object, the overflow object to lay out the overflow footnote reference information on the first page, generating overflow layout data, wherein the document object is different from the overflow object and the first footnote object, wherein the overflow object and the first footnote object are subordinate to the document object within a hierarchy;

determining a first page available footnote height based on the overflow layout data;

invoking, by the document object, the first footnote object to lay out the first footnote reference information on the first page, generating first footnote reference information layout data, if the a first page available footnote height is sufficient to lay out the first footnote reference information on the first page; and displaying the first page based on the overflow layout data and the first footnote reference information layout data.

2. The method of claim 1 wherein the first footnote object is a programming class that comprises a set of properties that define and store the first footnote reference information.

3. The method of claim 1, further comprising:
determining an available text element height based on the overflow layout data; and
invoking a text element object to lay out a text element within the available text element height, generating text element layout data.

4. The method of claim 3, wherein the first footnote marker is located within the text element.

5. The method of claim 4, further comprising:
determining the first page available footnote height based on the overflow layout data and the text element layout data; and
displaying the first page based on the overflow layout data, the text element layout data, and the first footnote reference information layout data.

6. The method of claim 5, further comprising:
rendering the overflow footnote reference information based on the overflow layout data;
rendering the text element based on the text element layout data; and
rendering the first footnote reference information based on the first footnote reference information layout data.

7. The method of claim 1, wherein the second footnote marker appears on a page previous to the first page.

8. The method of claim 1, further comprising:
invoking, by the document object, a paragraph object to lay out a portion of a paragraph associated with the first page, wherein the paragraph object is different from the document object and subordinate to the document object within the hierarchy.

9. A method comprising:
receiving from an online document processing service data defining a document comprising an element, a footnote marker in the element, and footnote reference information corresponding to the footnote marker;
generating an element object associated with the element and a footnote object associated with the footnote reference information, the element object comprising element layout out function for laying out the element and an element render function for rendering the element, the footnote object comprising a footnote layout function for laying out the footnote reference information and a footnote render function for rendering the footnote reference information, wherein the element object is different from the footnote object, wherein the footnote object is subordinate to the element object within a hierarchy;

invoking, by the element object, the footnote object to use the footnote layout function to generate footnote layout data associated with the footnote reference information;

displaying a page comprising the element, the footnote marker, and the footnote reference information based on the footnote layout data.

10. The method of claim 9, wherein the element comprises one of a paragraph, a line of text, an image, a table, a header, and a footer.

11. The method of claim 9, further comprising:
defining a segment comprising a portion of the footnote reference information less than all of the footnote reference information, if an available height is insufficient to lay out the footnote reference information;
wherein the footnote object uses the footnote layout function to generate segment layout data based on the segment;
the method further comprising
displaying the page comprising the element, the footnote marker, and the segment based on the segment layout data.

12. The method of claim 9, further comprising:
generating a second object associated with the element, the object having a second layout function for laying out the element; and
invoking the second object to use the second layout function to generate second layout data; and
displaying the element based on the second layout data.

13. The method of claim 9, wherein the footnote object further comprises a footnote render function for rendering the footnote reference information.

14. A non-transitory computer readable medium having program instructions stored thereon, the instructions capable of execution by a processor and defining the steps of:
generating a first footnote object corresponding to first footnote reference information associated with a first footnote marker located on a first page of a document, the first footnote object comprising a first footnote layout function for laying out the first footnote reference information and a first footnote render function for rendering the first footnote reference information;

identifying an overflow object associated with overflow footnote reference information corresponding to a second footnote marker appearing on a second page, the overflow object comprising an overflow object layout function for laying out the overflow footnote reference information and an overflow object render function for rendering the overflow footnote reference information, the overflow object being different from the first footnote object;

invoking, by a document object, the overflow object to lay out the overflow footnote reference information on the first page, generating overflow layout data, wherein the document object is different from the overflow object and the first footnote object, wherein the overflow object and the first footnote object are subordinate to the document object within a hierarchy;

determining a first page available footnote height based on the overflow layout data;

invoking, by the document object, the first footnote object to lay out the first footnote reference information on the first page, generating first footnote reference information layout data, if the a first page available footnote height is sufficient to lay out the first footnote reference information on the first page; and displaying the first page based on the overflow layout data and the first footnote reference information layout data.

15. The non-transitory computer readable medium of claim 14 wherein the first footnote object is a programming class that comprises a set of properties that define and store the first footnote reference information.

16. The non-transitory computer readable medium of claim 14, further comprising instructions defining the steps of:
   determining an available text element height based on the overflow layout data; and
   invoking a text element object to lay out a text element within the available text element height, generating text element layout data.

17. The non-transitory computer readable medium of claim 16, wherein the first footnote marker is located within the text element.

18. The non-transitory computer readable medium of claim 17, further comprising instructions defining the steps of:
   determining the first page available footnote height based on the overflow layout data and the text element layout data; and
   displaying the first page based on the overflow layout data, the text element layout data, and the first footnote reference information layout data.

19. The non-transitory computer readable medium of claim 18, further comprising instructions defining the steps of:
   rendering the overflow footnote reference information based on the overflow layout data;
   rendering the text element based on the text element layout data; and
   rendering the first footnote reference information based on the first footnote reference information layout data.

* * * * *

UNITED STATES PATENT AND TRADEMARK OFFICE
CERTIFICATE OF CORRECTION

| | |
|---|---|
| PATENT NO. | : 8,700,986 B1 |
| APPLICATION NO. | : 13/207051 |
| DATED | : April 15, 2014 |
| INVENTOR(S) | : Luiz Pereira |

It is certified that error appears in the above-identified patent and that said Letters Patent is hereby corrected as shown below:

IN THE CLAIMS:

At column 13, claim 9, lines 58-59, please change "object comprising element" to -- object comprising an element --;

At column 13, claim 9, line 59, please change "layout out function" to -- layout function --.

Signed and Sealed this
Eighth Day of July, 2014

Michelle K. Lee
*Deputy Director of the United States Patent and Trademark Office*